C. F. STRONG.
AUTOMATIC ELECTRIC GENERATING APPARATUS.
APPLICATION FILED SEPT. 15, 1913.
1,225,284. Patented May 8, 1917.
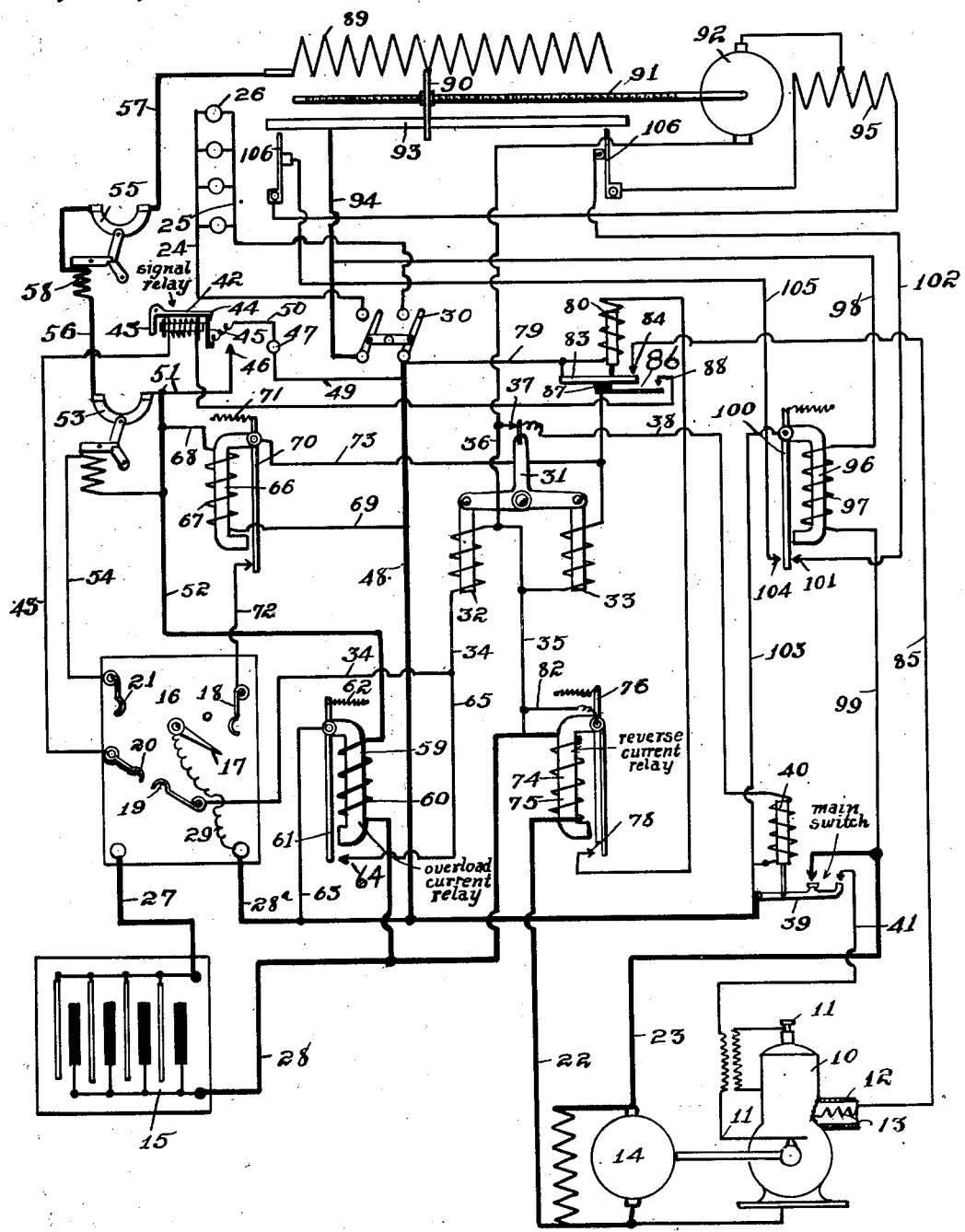
WITNESSES:
A. J. Hague
Will Freeman
INVENTOR.
Chester F. Strong
BY
Orwig & Bait
ATTORNEYS

UNITED STATES PATENT OFFICE.

CHESTER F. STRONG, OF DES MOINES, IOWA.

AUTOMATIC ELECTRIC GENERATING APPARATUS.

1,225,284.   Specification of Letters Patent.   Patented May 8, 1917.

Application filed September 15, 1913. Serial No. 789,906.

*To all whom it may concern:*

Be it known that I, CHESTER F. STRONG, a citizen of the United States, residing at Des Moines, in the county of Polk and State of Iowa, have invented a certain new and useful Automatic Electric Generating Apparatus, of which the following is a specification.

My invention relates to that class of automatic electric generating apparatuses disclosed in my application for United States Letters Patent filed on November 8, 1912, Serial Number 730,276.

In other devices of this class means have been provided whereby, when the meter that controls the device has been operated to such an extent as to indicate that the storage battery is approaching its discharge point, the internal combustion engine is started to carry the load or to provide current for the necessary current consumption, and also to recharge the storage battery. In some instances and where a very heavy current consumption is to be carried for a short time, it is desirable that the internal combustion engine be started before the battery approaches its discharge limit.

One of the objects of my invention is to provide means whereby when the current being used or discharged by the apparatus is unusually heavy, that is to say when there is an overload, the internal combustion engine will be automatically started so that the current for this overload will be supplied direct from the engine and will not be supplied from the battery, as in that case it would tend to injure the battery on account of its too rapid discharge, and further in this connection it is my object to provide automatic means whereby when the current being discharged from the apparatus is comparatively slight, the internal combustion engine will not operate and the current will be supplied by the storage battery to effect an economy in the operation of the plant, as under such conditions the internal combustion engine and dynamo electric machine cannot be operated as economically as the storage battery. In other words, it is my object to provide means whereby when there is an overload on the service wires, current will be supplied in the most economical and efficient manner, to wit by the internal combustion engine and dynamo electric machine, and when the current that is being delivered by the apparatus is comparatively slight in amount, current will also be supplied in the most economical and efficient manner, to wit by the storage battery without operating the internal combustion engine and dynamo electric machine.

A further object is to provide an automatic signal device, whereby, when the ampere hour meter has been operated to a certain extent to indicate that the battery has been sufficiently discharged, and that the internal combustion engine should be started to operate the dynamo electric machine, and in the event that the current consumption should continue and the internal combustion engine should not start, then a signal will be made whereby an operator may at once determine this condition and proceed to start the internal combustion engine; and further in this connection, it is my object to provide an emergency line opener, the function of which is that when the signal just referred to is not heeded by an operator and the current consumption from the battery continues for a short time, then the service line will be automatically opened to thus prevent further discharge of the battery.

In some instances, in an apparatus of this class, the dynamo electric machine will be operated to run the internal combustion engine by means of power furnished by the storage battery, and the engine will not start on account of extremely low temperature.

One of the objects of my invention is to provide means whereby, when the above named condition occurs, the intake of the engine will be automatically heated during the time that the dynamo electric machine is running and the engine is not in operation.

My invention consists in the construction, arrangement and combination of the various parts of the apparatus, whereby the objects contemplated are attained, as hereinafter more fully set forth, pointed out in my claims, and illustrated in the accompanying drawings, in which:

The complete apparatus embodying my invention is illustrated diagrammatically.

Referring to the accompanying drawings, I have used the reference numeral 10 to indicate an internal combustion engine of any ordinary type preferably provided with an electric ignition device 11. It is also provided with a fuel intake 12 in which is contained an electric heating element 13.

The numeral 14 indicates a dynamo electric machine operatively connected with the engine shaft. The numeral 15 indicates a storage battery. The numeral 16 indicates an ampere hour meter of any ordinary construction provided with a movable indicator 17 and a number of contact fingers arranged in the path of the movable indicator. The first of these contact fingers 18 is so arranged, as will be hereinafter more fully described, that when the indicator 17 touches it, it will cause the recharging of the battery to be stopped. The next indicator arm 19 is so arranged that when the indicator finger touches it, the recharging of the battery will commence. Adjacent to the finger 19 is another finger 20 so arranged that if the engine should not promptly commence to recharge the battery a signal will be given to the operator and the circuit to the dynamo electric machine and engine ignition is opened. The last of these fingers, indicated by the numeral 21, is so arranged that if the engine should not start promptly and the battery should run down to a point too near a total discharge, the current from the battery to the service wires will be automatically cut off. The type of ampere hour meter which I preferably employ is the type known as the differential shunted ampere hour meter in which the meter runs faster on discharge than on charge of the battery.

Electrically connected with the dynamo electric machine are two conductors 22 and 23 which lead indirectly to the service wires 24 and 25. Between these service wires, I have indicated in the drawings a number of electric lamps 26 which are used simply diagrammatically to indicate that these service wires may be employed for the consumption of electric current either in the lighting of lamps or for other electrical purposes.

The battery 15 is provided with two conductor wires 27 and 28, the conductor 27 being directly connected to the ampere hour meter and the conductor 28 being indirectly connected to it. The conductor 28ª is electrically connected to the indicator point 17 by means of the conductor 29. These conductors 27 and 28 also lead indirectly to the service wires 24 and 25.

In order to provide for manually breaking the circuit to the service wires, I have provided a switch 30. When the storage battery is being employed to provide current for the service wires, the current thus generated will flow through the conductor 27, through the ampere hour meter and from thence to the service wires and return to the battery. When an electric current is being generated by the dynamo electric machine, the current may flow through the conductor 23 to the ampere hour meter and then through the storage battery, or it may travel direct to the service wires and return to the dynamo electric machine through the conductor 23. Hence if the dynamo electric machine is running during the time that current is being consumed from the service wires, only so much of the current thus generated by the dynamo electric machine will flow through the ampere hour meter as is ultimately utilized in recharging the storage battery and that part of the current thus generated by the dynamo electric machine that is used to maintain the service wires will not affect the operation of the ampere hour meter.

Assuming that the storage battery is wholly or partly charged and that current is being consumed by the service wires, then the current from the storage battery will flow through the ampere hour meter and this current will cause the indicator 17 to move downwardly, as shown in the drawings, toward the finger 19. When a certain predetermined quantity of current has been discharged from the storage battery, the indicator arm 17 will strike the contact arm 19.

When this occurs, it is desirable to have the internal combustion engine started, and to effect this operation, I have employed a rocker switch, indicated generally by the numeral 31. This rocker switch has two solenoids 32 and 33, the solenoid 32 being electrically connected by a conductor 34 with the contact arm 19 and there being a return conductor 35 also connected with the solenoid. When the solenoid 32 is energized, the rocker switch is moved to the position shown in the drawings by which a circuit is established through the conductor 36, the contact point 37 and the conductor 38 to the main switch for controlling the movement of the engine and dynamo electric machine. This main switch is indicated generally by the reference numeral 39 and is provided with a solenoid 40. The conductor wire 38 is connected to this solenoid and when the solenoid is energized the main switch 39 is elevated, thus causing the main switch to be closed and when this is closed a circuit will be established from the battery through the ampere hour meter to the dynamo electric machine for operating it and at the same time the circuit will be closed through the conductor 41 that leads to the engine ignition device 11, thus serving to start the engine.

If, under the conditions just described, the engine should not promptly start and operate under its own power, the ampere hour meter will continue to be operated and the arm 17 will move past the contact finger 19 and engage the contact finger 20. When this occurs I have provided means for operating a signal so that an operator, if present, may take steps to start the engine. This signal comprises a signal relay, indicated generally by the reference numeral 42, electrically connected by the conductor 43 with the contact finger 20. This signal relay 42 is provided with a solenoid which, when energized, will draw the armature 43 to the right. This will elevate the hook 44 and permit the conductor bar 45 to drop into position into engagement with the contact point 46 where it remains until manually returned. When this occurs a current will flow through the signal device, indicated by the reference numeral 47, which signal device may be a lamp or bell or other signal. The current for operating the signal flows through the conductor 48 and the conductor 49 to the signal and then through the conductor 50 to the conductor bar 45 and then through the contact 46 through the conductor 51 to the return conductor 52.

If the conditions just before described continue for a given length of time and the engine is not started either by the dynamo electric machine or by the operator, then the battery will discharge with considerable rapidity and the indicator 14 will continue to move beyond the contact arm 20 until it strikes the contact arm 21. When this occurs it is very desirable that the current flowing from the battery be immediately stopped and to provide for this purpose, I employ a shunt trip circuit breaker indicated generally by the reference numeral 53 electrically connected with the contact point 21 by the conductor 54. This will result in operating the shunt trip circuit breaker to open the circuit to the service wires and before the battery is wholly discharged so that an operator may give to the engine the necessary attention and have it started before damage to the storage battery occurs.

I have also provided means whereby, in the event that there is a heavy overload in the service wires which might tend to injure or damage the apparatus, the circuit through the service wires will be automatically broken. This I accomplish by means of the overload circuit breaker indicated generally by the reference numeral 55 which is electrically connected at one end with the conductor 51 through the circuit breaker 53 and the conductor 56 and at its other end it is connected to a conductor wire 57 which leads indirectly to the service wires, it being so arranged that when its solenoid 58 is excited the circuit breaker will be operated to open the circuit.

In an apparatus of this kind, it sometimes happens that, when the storage battery is fully charged and the indicator arm 17 of the ampere hour meter is adjacent to the contact arm 18 and the engine is idle, a heavy overload is placed on the service wires. Under such circumstances, it is obviously very desirable that the engine be immediately started and the dynamo electric machine be operated to assist the storage battery in carrying this heavy overload, and it is also desirable that the engine be started before the battery has been discharged to such an extent as to bring the indicator arm 17 into engagement with the contact arm 19, as obviously under such circumstances it is not desirable to have the battery discharged with great rapidity. Assuming that the indicator arm 17 is in the position shown in the drawings and that a heavy overload is applied to the service wires, then it is desirable that some means be controlled by the quantity of current passing over the service wires, to start the engine. For this purpose, I have provided the overload current relay indicated generally by the reference numeral 59 and which comprises an electromagnet having a coil 60 wound upon it and included in the main circuit between the storage battery and the service wires and so arranged that while a normal current is passing through this coil the magnet will not attract its armature but when an excessive current is passing through the coil the armature will be attracted. This armature is indicated by the numeral 61 and is provided with a spring 62. A conductor wire 63 is connected to the main conductor leading from the battery through the ampere hour meter at one end and to the armature 61 at the other end. A contact point 64 is arranged adjacent to the armature 61 and is connected by a conductor 65 to the conductor 34 leading to the rocker switch. Hence when the pull of the magnet 59 becomes great enough a contact is made between the armature 61 and the contact point 64, thus establishing a circuit through the solenoid 32 of the rocker switch, causing the rocker switch to close the circuit between the contact point 37 and the conductor 38 which, as before described, will cause the engine to be started in the ordinary manner. This overload current relay is inactive during all of the normal operations of the device and is only operative under the conditions before named when a considerable overload is being carried by the service wires. Immediately upon the reduction of the amount of current being utilized by the service wires, the pull of the magnet 59 is insufficient to overcome the spring 62 and the armature 61 then returns to the position illustrated in the drawings. However, as long as the overload is being carried by the service wires the dynamo electric machine will continue to be operated to take care of the excessive current consumption so that the battery is not injured by reason of a too rapid discharge.

For the purpose of providing means for stopping the engine only after a certain predetermined quantity of electricity has flowed into the storage battery and the voltage of the storage battery has been raised to the point that indicates a full charge, I provide the following mechanism: The numeral 66 indicates an electromagnet having thereon a coil 67 connected at one end by a conductor 68 to the conductor 52 of the main circuit and at its other end by a conductor 69 to the conductor 48 of the main circuit. A pivoted armature 70 is provided for this magnet having a spring 71 to normally hold one end of the armature away from the magnet. The magnet is energized to attract the armature only when the condition of the battery is such as to indicate that the storage battery has been practically fully charged. When this armature 67 is thus attracted a circuit is closed through the conductor 72 which communicates at one end with the contact arm 18 of the ampere hour meter through the armature 70 and through a conductor 73 that leads to the coil of the solenoid 33 of the rocker switch, and when this solenoid of the rocker switch has been energized the rocker switch is thrown open to break the circuit between the contact point 37 and the conductor 38, thus releasing the main switch 40 and breaking the circuit through the dynamo electric machine and the engine ignition device.

I have previously herein described the operation of the parts assuming that the current is being supplied by the battery and the indicator arm 17 engages first the contact arm 19, then the arm 20, this assumption being based upon the failure of the engine to properly operate.

Assuming now that when the indicator arm 17 strikes the arm 20 and the engine is properly started, then it is of course undesirable to have the signal operated. I have therefore provided means whereby, as soon as a current is produced by the dynamo electric machine operating as a generator, the heating element for the engine will be rendered inoperative and the signal device will also be prevented from operating. This mechanism comprises a reverse current relay and a double switch. The reverse current relay comprises an electromagnet 74 having a coil thereon, indicated by the numeral 75, included in the circuit with the conductor 22 from the dynamo electric machine and the conductor 28 connected with the battery. Obviously when current is flowing from the battery to the dynamo electric machine, it goes through this coil in one direction and when current is flowing from the dynamo electric machine, it goes through the coil in the opposite direction. In one instance, the magnet 74 is polarized in one direction and in the other instance in a reverse direction.

Adjacent to the magnet 74 is a polarized armature 76 provided with a spring 77 to normally hold its lower end away from the magnet. This polarized armature may be either a permanent magnet or an electromagnet. 78 indicates a contact point so arranged that it will be in electric contact with the armature 76 when the lower end of the armature is attracted to the magnet 74. This arrangement is such that when current is flowing from the battery to the motor, the magnet 74 is polarized in such a manner as to attract the armature 76 and when it is thus attracted a circuit will be closed through the armature and through the contact point 78, thus establishing a circuit through the conductor 79 to the solenoid 80 of the double switch, and from this solenoid through the conductor 81 to the contact point 78, then through the armature 76 and through the conductor 82 to the return conductor of the battery. This flow of current from the battery elevates the switch member 83 and causes the switch member 83 to engage the contact point 84 and thus close a circuit through the conductor 85 to the heating element 13 of the engine. As soon however as the engine is started and the current is flowing from the dynamo electric machine, then the magnet 74 of the reverse current relay is polarized in an opposite direction so that the polarized armature 77 is repelled by the magnet 74 and the circuit is broken at the contact point 78. This permits the solenoid core 80 to drop by gravity and thus break the circuit through the heating element 13 as this heating element should not ordinarily be used when the engine is properly running. Connected with this switch 83 is a second switch member 86, there being an insulation block 87 between the switches 83 and 86. When the switch 83 is in its elevated position, then the switch 86 is held in contact with the point 88 and the circuit through the emergency cut-out contact finger 20 on the ampere hour meter is operative, thus operating the signal 47 and breaking the circuit through the main switch 39. The switch 83 is held in its elevated position when current is passing from the battery to the dynamo electric machine to drive the same as a motor. This results from the fact that current passes through the coil 75 of the relay magnet 74, attracting its armature so as to make engagement with the contact 78, and thus close the circuit through the solenoid 80, drawing its armature upward so as to complete the circuit at the contact 88. When the circuits are in this condition, the indicator arm 17 moves clockwise and, if the dynamo electric machine has failed to start, continues to move until it makes engagement with the contact 20, thus establishing a circuit from the conductor 28$^a$ through the indicator arm 17, contact 20, conductor 43, coil of signal relay 42, contacts 88 and 86, coil of solenoid 33 and conductor 35 to the other side of the circuit. This results in the movement of the rocker arm 31, so as to produce an open circuit at the contact 37, breaking the circuit through the conductor 38 and coil of solenoid 40, and permitting the switch arm 39 to move to open position so as to open the circuit through the dynamo electric machine, and also through the ignition of the gas engine. When this occurs, there is something serious the matter, which fact is indicated by the signal 47, which is energized at that time through the movement of the contact arm 45, which had been released by the movement of the armature 43, due to the current passing through the coil at the signal relay 42. If, after the dynamo electric machine has thus been cut out of circuit, the translating devices remain connected with the battery, so that the battery continues to supply a current thereto, the indicator arm 17 after a predetermined amount of current has been discharged from the battery, will make engagement with the contact 21. This will establish a circuit from the main 28ª, through the contact 21, conductor 54 and coil of the shunt trip circuit breaker 53, and thence through the conductor 52 and coil 60 to the other side of the circuit, thus actuating the shunt trip circuit breaker so as to entirely disconnect the translating devices from the battery.

When the dynamo electric machine is acting as a generator, then the direction of flow of current through the reverse current relay, will cause the circuit to be broken at 78, thus permitting the switch 83 and the switch 86 to drop. This breaks the circuit through the heater for the engine intake, and also breaks the circuit that had been established through the finger 20, thereby preventing this circuit from operating the rocker switch, thus leaving the main switch 39 in its closed position.

I have also provided an improved voltage regulator for constantly maintaining the voltage at a uniform point regardless of the amount of current consumption on the service wires. For this purpose, I have provided a resistance coil 89 connected with the conductor 57 and designed to be engaged by a traveling conductor 90 provided with a screw threaded opening and mounted on the screw threaded rod 91. This screw threaded rod is connected to the shaft of a motor 92. The conductor 90 is constantly in engagement with a stationary conductor 93 electrically connected by a conductor 94 to the switch 30.

By this arrangement, it is obvious that when the motor 92 runs in one direction the movable conductor 90 moves in one direction and cuts out a part of the resistance coil 89, and when the motor 92 runs in the opposite direction, the movable conductor 90 moves in the opposite direction on the shaft 91 and cuts in a greater part of the resistance coil 89.

In order to control the movements of the motor 92 so that a constant voltage is maintained on the service wires, I have provided a series field for the motor 92 wound in opposite directions and indicated generally by the reference numeral 95.

In order to control the direction of the flow of current through the field 95, I have provided a voltage regulator relay comprising an electromagnet 96 having a coil 97. This coil is connected by a conductor 98 with the conductor 94 at one end and it is connected with the conductor 99 at the other end which leads to the return conductor of the main circuit. A spring actuated armature 100 is provided for the magnet 96 and the parts are so arranged that when the voltage passing through the coil 97 is excessive the armature will be attracted toward the magnet and when the voltage is of a less amount the armature will be moved by its spring away from the magnet. When the armature is in the position shown in the drawings no current will be supplied to the field 95 and the motor 92. When the voltage of the current being used in the service wires is excessive then the armature 100 will be drawn toward the magnet 96 and a circuit will be established through the armature 100 and through the contact point 101 which is connected by a conductor 102 with one side of the field 95 and current is supplied to the armature 100 by means of the conductor wire 103 connected to the main conductor from the battery. Hence when the voltage is high, the motor will be run in one direction as required to operate the motor 92 in such a manner as to move the conductor 90 toward the right, as shown in the drawings, thus cutting in a greater amount of the resistance coil. When however the voltage is low in the service wires the armature 100 will engage with the contact point and establish a circuit through the conductor 105 to the right side of the field 95 to thereby operate the motor 92 in an opposite direction as required to move the conductor 90 toward the left, as shown in the drawings to thereby cut out a part of the resistance coil.

In practice and when the current consumption is substantially constant, the motor 92 is idle and it only is operated when there is a material increase or decrease in the current consumption, and in either event, by means of the voltage regulator relay, the motor is operated to move the conductor 90 in the proper direction with relation to the resistance coil to maintain the voltage at the predetermined load. In this connection, it is desirable that means be provided for stopping the motor 92 when the conductor 90 has moved to either limit of the resistance coil. For this purpose, I have provided the spring switches, indicated by the numeral 106, one being arranged at each end of the stationary conductor 93. These switches are arranged in the conductors leading to the opposite sides of the field 95 and when the movable conductor 90 strikes one of the switches the circuit is broken through that particular part of the field when the motor is stopped.

By employing the emergency cut-out 20 in connection with the reverse current relay, I obtain a very decided advantage in that if the engine should not start properly when the indicator 17 engages the emergency cut-out 20 a signal will be given, and if the engine does start properly the emergency cut-out is rendered ineffective and the current produced by the dynamo electric machine will be utilized for carrying the service wires and recharging the batteries, or in the event that the load is greater than the capacity of the engine and generator the batteries can assist in carrying the same and the indicator 17 can go past the contact 20 without stopping the engine and generator and throwing signal by virtue of the reverse current relay being open as a result of the dynamo electric machine acting as a generator.

Another advantage of my invention is that the intake of the engine is heated automatically when the dynamo electric machine is running as a motor to crank the engine so that in case of extremely low temperature the engine will start promptly.

By the use of my improved overload current relay, I gain a decided advantage in that when current is being supplied by the battery for the service wires, and in the event that there is a considerable overload on the service wires, the engine will be automatically started to supply current from the dynamo electric machine to carry this overload and this will take place before the condition of the ampere hour meter indicates that the battery is approaching its discharge point. In this way danger of injuring the battery by reason of too rapid discharge on account of an overload is avoided. This overload relay device, therefore, coacts with the current measuring device in that in my improved apparatus the essential function of the overload relay device is to automatically and promptly close the main switch and start the internal combustion engine at any time during the operation of the device that there is an overload on the service wires. The current measuring device coacts with this overload relay device in that the internal combustion engine is started for battery recharging purposes only by the current measuring device and not by the overload relay device, so that at all times the battery is kept in its properly charged condition, which obviously could not be done by means of the overload relay device itself or by the current measuring device itself under the conditions which frequently occur in use where there are at times heavy overloads on the service wires.

In a device of this kind the current produced at the various stages of the proceedings varies considerably on account of the varying condition of the battery and also on account of the production of current by the dynamo electric machine. Furthermore the voltage is materially increased or decreased on account of the amount of current consumption in the service wires, and it is therefore desirable, especially when the service wires are used for lighting purposes, to keep the voltage constant.

I claim as my invention:

1. In an automatic electric generating apparatus, the combination of an engine, a dynamo electric machine operatively connected with the engine, a storage battery electrically connected with the dynamo electric machine, a main switch included in a circuit between the storage battery and the dynamo electric machine for closing the circuit to operate the dynamo electric machine as a motor to start the engine, an overload current relay included in a circuit from the storage battery so arranged as to close said main switch when the current in the battery is being discharged at a certain predetermined rate, and a current measuring device electrically connected with the storage battery and also electrically connected with the main switch for automatically closing said main switch when the battery has reached a certain predetermined condition of discharge.

2. In an automatic electric generating apparatus, the combination of an engine, a dynamo electric machine operatively connected with the engine, a storage battery electrically connected with the dynamo electric machine, a main switch included in a circuit between the storage battery and the dynamo electric machine for closing the circuit to operate the dynamo electric machine as a motor to start the engine, an overload current relay included in a circuit from the storage battery so arranged as to close said main switch when the current in the battery is being discharged at a certain predetermined rate, and a current measuring device including a movable member capable of moving in one direction when the battery is discharging, and in another direction when the battery is being recharged, said current measuring device being electrically connected with the storage battery, and said movable member being capable in one position of closing a circuit through the main switch for automatically closing the main switch when the movable member has reached the predetermined position which it assumes when the battery is in condition to be recharged.

3. In an automatic electric generating apparatus, the combination of an engine, a dynamo electric machine operatively connected with the engine, a storage battery electrically connected with the dynamo electric machine, a main switch included in a circuit between the storage battery and the dynamo electric machine for closing the circuit to operate the dynamo electric machine as a motor to start the engine, an overload current relay included in a circuit from the storage battery so arranged as to close said main switch when the current in the battery is being discharged at a certain predetermined rate, and a current measuring device electrically connected with the storage battery and designed to be operated in one direction when the battery is discharging and in another direction when the battery is being recharged, said current measuring device including a movable member so arranged that until said movable member has reached a certain predetermined position the said main switch will be held closed, and when said predetermined position has been reached the main switch may be opened to permit the engine and dynamo electric machine to discontinue their operation.

4. In an automatic electric generating apparatus, the combination of an engine, a dynamo electric machine operatively connected with the engine, a storage battery electrically connected with the dynamo electric machine, a main switch included in the circuit between the storage battery and the dynamo electric machine for closing the circuit to operate the dynamo electric machine as a motor to start the engine, and two devices each capable at times of controlling said main switch, one of said devices comprising an overload relay capable of closing the switch upon an excessive discharge from the battery, and the other comprising a current measuring device capable of closing said main switch when said current measuring device is in condition indicating that the battery should be recharged, whereby the apparatus will be maintained in an economical working condition with the dynamo electric machine working constantly during an overload in the current consumption, and the battery supplying all of the current at other times until the battery is in condition to be recharged.

5. In an automatic electric generating apparatus, the combination of an engine, a dynamo electric machine operatively connected with the engine, a storage battery electrically connected with the dynamo electric machine, a current measuring device electrically connected with the storage battery and including a movable member, means for closing a circuit when the movable member has reached a certain predetermined position, a signal relay included in the latter circuit, a signal device, means actuated by the signal relay for actuating the said signal device, means whereby a circuit will be closed when said movable member reaches another predetermined position, and a circuit breaker capable of operating when said latter circuit is closed by means of the movable member, said circuit breaker being designed to open the main circuit from the storage battery to the service wires to thereby automatically prevent further discharge of the storage battery.

6. In an automatic electric generating apparatus, the combination of an internal combustion engine, an electric heating device for the fuel intake of said engine, a dynamo electric machine operatively connected with said engine, a storage battery electrically connected with the dynamo electric machine, service wires electrically connected with both the dynamo electric machine and with the storage battery, a reverse current relay electrically connected with the dynamo electric machine and so arranged that when the dynamo electric machine is operating as a generator the reverse current relay will be open and when acting as a motor it will be closed, and means whereby, when said reverse current relay is closed, a circuit will be established through the electric heater for the engine.

7. In an automatic electric generating apparatus, the combination of an internal combustion engine, a dynamo electric machine operatively connected with said engine, a storage battery electrically connected with the dynamo electric machine, service wires electrically connected with both the dynamo electric machine and with the storage battery, a reverse current relay electrically connected with the dynamo electric machine and so arranged that when the dynamo electric machine is operating as a generator the reverse current relay will be open and when acting as a motor it will be closed, a current measuring device electrically connected with the storage battery, a signal relay, means whereby when the current measuring device has been operated to a certain predetermined extent a circuit will be established through the signal relay, a signal device, means operated by the signal relay for actuating the signal device, and means whereby the signal relay device is rendered inoperative when the reverse current relay is held in its open position by reason of a current flowing from the dynamo electric machine and acting as a generator.

8. In an automatic electric generating apparatus, the combination of an internal combustion engine, a dynamo electric machine operatively connected with said engine, a storage battery electrically connected with the dynamo electric machine, service wires electrically connected with both the dynamo electric machine and with the storage battery, a reverse current relay electrically connected with the dynamo electric machine and so arranged that when the dynamo electric machine is operating as a generator the reverse current relay will be open and when acting as a motor it will be closed, a current measuring device electrically connected with the storage battery, a signal relay, means whereby, when the current measuring device has been operated to a certain predetermined extent a circuit will be established through the signal relay, a signal device, means operated by the signal relay for actuating the signal device, and means whereby the signal relay device is rendered inoperative when the reverse current relay is held in its open position by reason of a current flowing from the dynamo electric machine and acting as a generator, said means being also so arranged that when the reverse current relay is closed when the dynamo electric machine is being operated as a motor, the signal relay will be operated upon a proper movement of the current measuring device.

9. In an automatic electric generating apparatus, the combination of an engine, a dynamo electric machine operatively connected with the engine, a storage battery electrically connected with the dynamo electric machine, a main switch included in a circuit between the storage battery and the dynamo electric machine for closing the circuit to operate the dynamo electric machine as a motor to start the engine, an overload current relay included in a circuit from the storage battery so arranged as to close said main switch when the current in the battery is being discharged at a certain predetermined rate, a current measuring device electrically connected with the storage battery and also electrically connected with the main switch for automatically closing said main switch when the battery has reached a certain predetermined condition of discharge, and means for automatically stopping the flow of current from the battery to the dynamo electric machine for a certain predetermined period.

10. In an automatic electric generating apparatus, the combination of an engine, a dynamo electric machine operatively connected with the engine, a storage battery electrically connected with the dynamo electric machine, a circuit closing means for establishing a circuit from the battery to the dynamo electric machine for engine starting purposes, and means for controlling the electric circuit between the dynamo electric machine and the storage battery, said means including a current measuring device electrically connected with the storage battery and having a movable member, said movable member being designed to operate said circuit closing means when it has reached a certain predetermined position, and said controlling means also including a device for automatically breaking the circuit thus established, in the event that the dynamo electric machine has failed to start the engine after a certain predetermined period in the operation of the device.

11. In an automatic electric generating apparatus, the combination of an engine, a dynamo electric machine operatively connected with the engine, a storage battery electrically connected with the dynamo electric machine, a circuit closing means for establishing a circuit from the battery to the dynamo electric machine for engine starting purposes, means for controlling the electric circuit between the dynamo electric machine and the storage battery, said means including a current measuring device electrically connected with the storage battery and having a movable member, said movable member being designed to operate said circuit closing means when it has reached a certain predetermined position, and said controlling means also including a device for automatically breaking the circuit thus established, in the event that the dynamo electric machine has failed to start the engine after a certain predetermined period in the operation of the device, service wires automatically connected with the storage battery and the dynamo electric machine, and a circuit breaking device automatically operated after the aforesaid circuit breaking device has been operated for breaking the circuit from the storage battery to the service wires.

Des Moines, Iowa, August 30, 1913.

CHESTER F. STRONG.

Witnesses:
 M. WALLACE,
 L. ROBINSON.